(12) United States Patent  
Brettschneider

(10) Patent No.: US 9,140,390 B2  
(45) Date of Patent: Sep. 22, 2015

(54) CHARGE-AIR HOSE FOR MOTOR VEHICLES HAVING TWO KNIT PLIES

(71) Applicant: ContiTech Schlauch GmbH, Hannover (DE)

(72) Inventor: Ulrich Brettschneider, Osterode (DE)

(73) Assignee: ContiTech Schlauch GmbH, Hannover (DE)

( * ) Notice: Subject to any disclaimer, the term of this patent is extended or adjusted under 35 U.S.C. 154(b) by 114 days.

(21) Appl. No.: 13/780,862

(22) Filed: Feb. 28, 2013

(65) Prior Publication Data

US 2013/0167964 A1    Jul. 4, 2013

Related U.S. Application Data

(63) Continuation of application No. PCT/EP2011/063816, filed on Aug. 11, 2011.

(30) Foreign Application Priority Data

Aug. 30, 2010   (EP) .................................... 10174560

(51) Int. Cl.
  *F16L 11/04* (2006.01)
  *F16L 11/08* (2006.01)
  (Continued)

(52) U.S. Cl.
  CPC ........... *F16L 11/086* (2013.01); *B29C 47/0023* (2013.01); *B29C 47/0052* (2013.01); *B29C 47/021* (2013.01); *B29D 23/001* (2013.01); *B32B 1/08* (2013.01); *B32B 5/026* (2013.01);
  (Continued)

(58) Field of Classification Search
  USPC .......................................... 138/124, 125, 126
  See application file for complete search history.

(56) References Cited

U.S. PATENT DOCUMENTS 2,788,804 A * 4/1957 Larkin .......................... 138/125
3,253,618 A   5/1966 Cook
(Continued)

FOREIGN PATENT DOCUMENTS

DE         34 45 282 A1    6/1986
DE         100 36 235 A1   3/2002
(Continued)

OTHER PUBLICATIONS

International Search Report dated Nov. 29, 2011 of international application PCT/EP2011/063816 on which this application is based.

*Primary Examiner* — James Hook
(74) *Attorney, Agent, or Firm* — Walter Ottesen P.A.

(57) ABSTRACT

A method for making a charge-air hose for a motor vehicle includes producing a continuous inliner having a cylindrical inner surface in an extrusion process while pneumatically shaping the cylindrical inner surface without a mandrel by bringing the inner cylindrical surface to an inner diameter $D_1$. Thereafter, an elastomeric inner ply, a first knit ply, an elastomeric intermediate ply, a second knit ply and an elastomeric outer ply are applied to the inliner successively, coaxially and continuously to form a continuous charge-air hose section. The first and second knit plies are made from an endless yarn and have respective orientations different from each other. Charge-air hose blanks are cut to length and the charge-air hose blanks are shaped with a mandrel defining a curved longitudinal axis and having a diameter $D_2$ which, in at least a longitudinal segment, is at least 6% greater than the inner diameter $D_1$.

16 Claims, 6 Drawing Sheets

(51) Int. Cl.
  *B29C 47/00* (2006.01)
  *B29C 47/02* (2006.01)
  *B29D 23/00* (2006.01)
  *B32B 1/08* (2006.01)
  *B32B 5/02* (2006.01)
  *B32B 25/10* (2006.01)
  *F02M 35/10* (2006.01)
  *D04B 1/22* (2006.01)
  *B29C 53/08* (2006.01)
  *B29K 21/00* (2006.01)
  *B29K 83/00* (2006.01)
  *B29K 105/08* (2006.01)
  *B29K 105/24* (2006.01)
  *B29L 23/00* (2006.01)
  *B29L 31/30* (2006.01)

(52) U.S. Cl.
  CPC ............... *B32B 25/10* (2013.01); *D04B 1/225* (2013.01); *F02M 35/10321* (2013.01); *F02M 35/10334* (2013.01); *F16L 11/04* (2013.01); *B29C 53/083* (2013.01); *B29C 2793/009* (2013.01); *B29C 2947/92104* (2013.01); *B29C 2947/92447* (2013.01); *B29K 2021/00* (2013.01); *B29K 2083/00* (2013.01); *B29K 2105/0836* (2013.01); *B29K 2105/246* (2013.01); *B29K 2313/00* (2013.01); *B29L 2023/005* (2013.01); *B29L 2031/3055* (2013.01); *B32B 2250/05* (2013.01)

(56) References Cited

U.S. PATENT DOCUMENTS

| | | | | |
|---|---|---|---|---|
| 3,682,201 | A * | 8/1972 | Atwell et al. | 138/125 |
| 3,750,712 | A * | 8/1973 | Brand | 138/124 |
| 4,679,599 | A * | 7/1987 | Newberry et al. | 138/104 |
| 4,870,995 | A * | 10/1989 | Igarashi et al. | 138/126 |
| 5,077,018 | A | 12/1991 | Grolmes et al. | |
| 5,158,113 | A * | 10/1992 | Ozawa et al. | 138/137 |
| 6,112,771 | A * | 9/2000 | Aoyagi et al. | 138/127 |
| 6,807,988 | B2 | 10/2004 | Powell et al. | |
| 7,528,217 | B2 | 5/2009 | Lee et al. | |
| 2002/0100516 | A1* | 8/2002 | Powell et al. | 138/125 |
| 2006/0182914 | A1* | 8/2006 | Yasumatsu et al. | 428/36.8 |
| 2006/0223399 | A1 | 10/2006 | Kurimoto et al. | |
| 2008/0072984 | A1* | 3/2008 | Branch et al. | 138/124 |
| 2008/0236695 | A1* | 10/2008 | Takagi | 138/126 |
| 2009/0320952 | A1* | 12/2009 | Amma et al. | 138/126 |

FOREIGN PATENT DOCUMENTS

| | | |
|---|---|---|
| DE | 10 2004 051 073 A1 | 5/2006 |
| DE | 20 2008 001 196 U1 | 5/2008 |
| DE | 10 2006 058 470 A1 | 6/2008 |
| DE | 10 2010 017 679 A1 | 1/2012 |
| EP | 1 396 670 A1 | 3/2004 |
| GB | 1 146 872 A | 3/1969 |
| RU | 2213814 C2 | 10/2003 |
| RU | 2213815 C2 | 10/2003 |

* cited by examiner

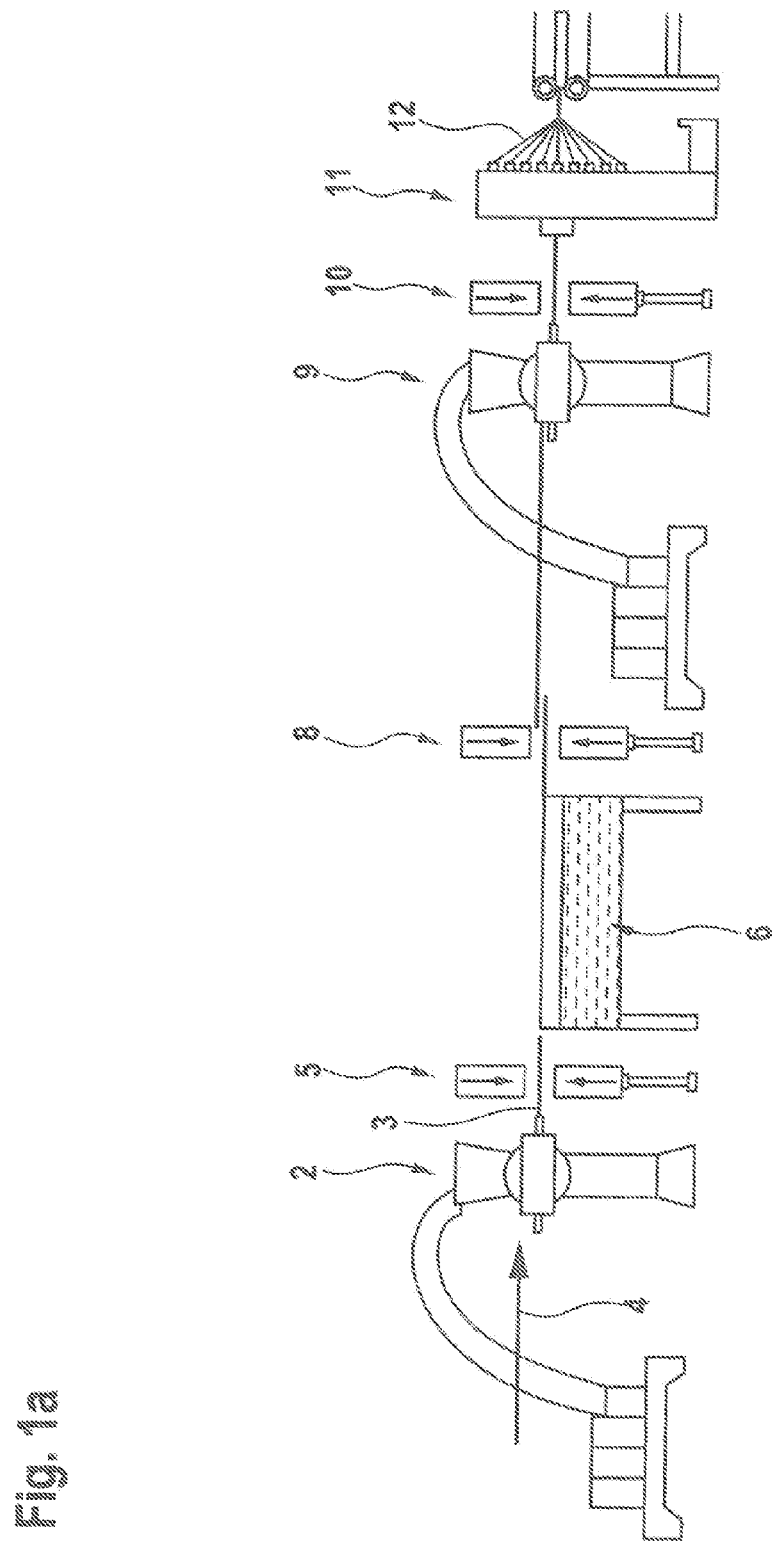

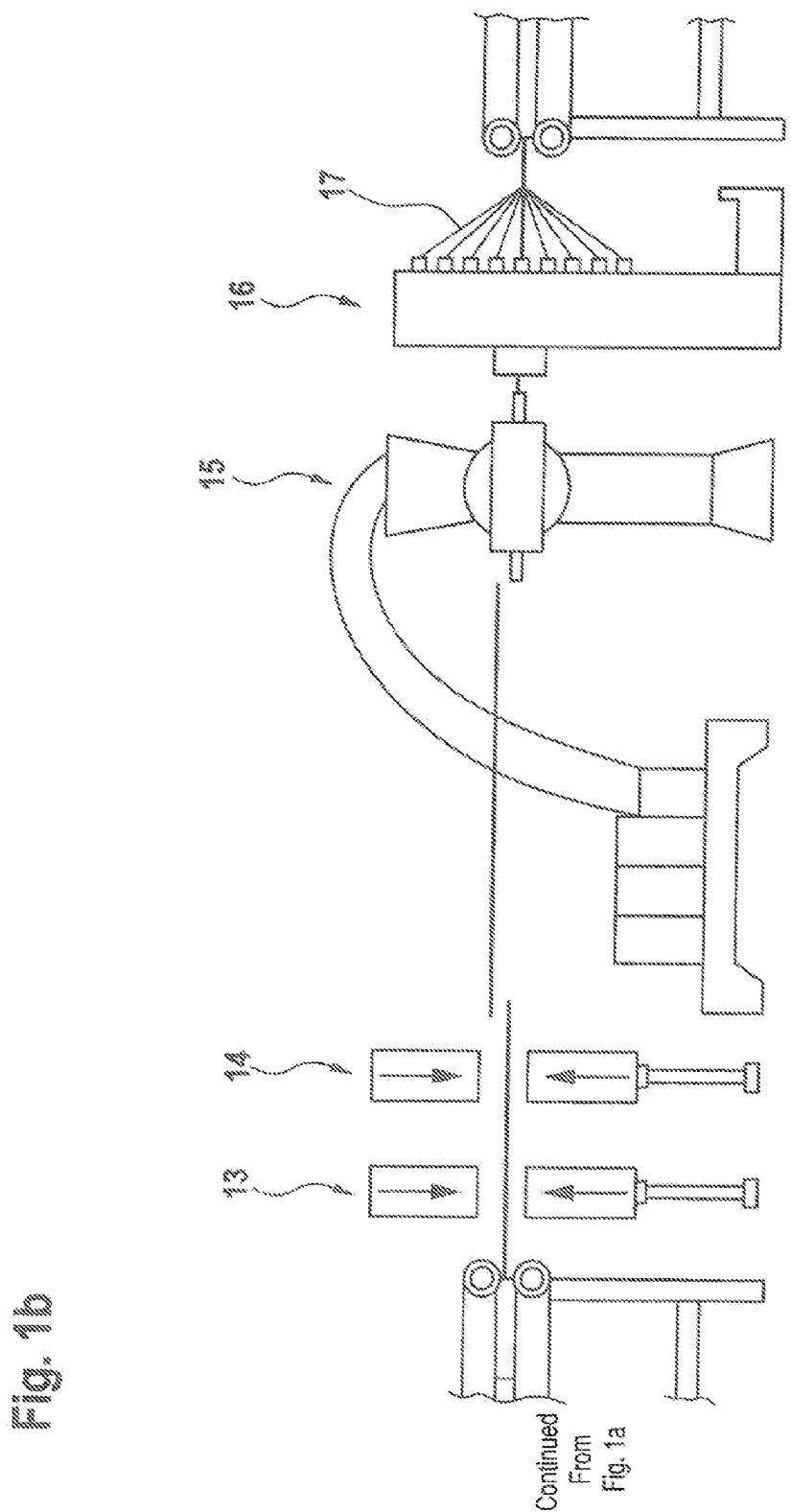

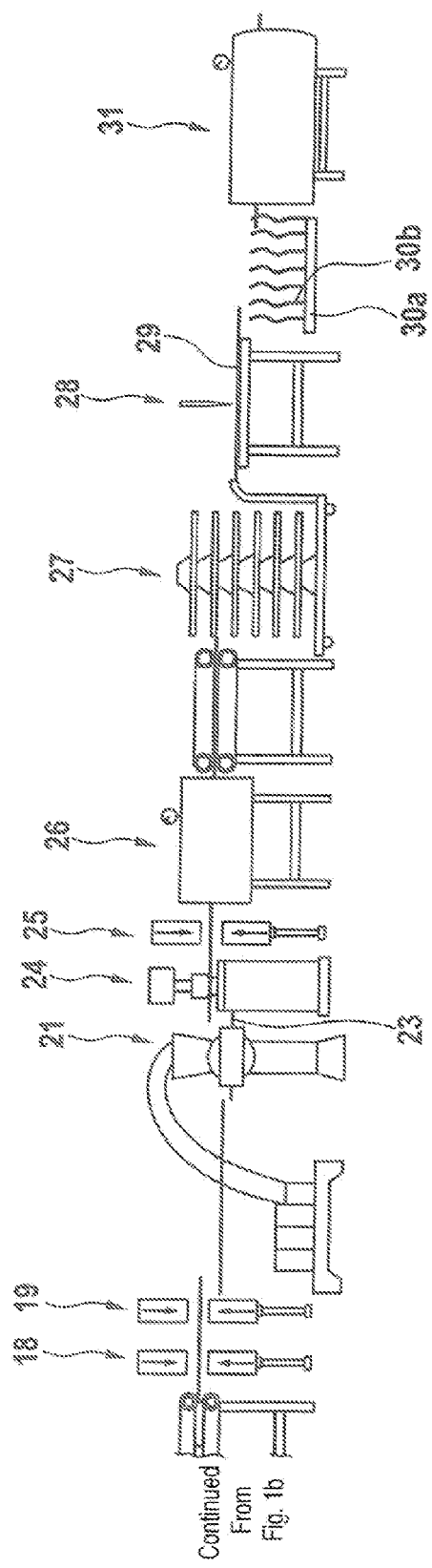

CHARGE-AIR HOSE FOR MOTOR VEHICLES HAVING TWO KNIT PLIES

CROSS REFERENCE TO RELATED APPLICATIONS

This application is a continuation application of international patent application PCT/EP2011/063816, filed Aug. 11, 2011, designating the United States and claiming priority from European application 10174560.2, filed Aug. 30, 2010, and the entire content of both applications is incorporated herein by reference.

FIELD OF THE INVENTION

The invention relates to a method for making a charge-air hose for motor vehicles. The invention relates, furthermore, to a charge-air hose produced via such a method.

BACKGROUND OF THE INVENTION

EP 1 396 670 B1 describes the increasing trend in motor vehicles to increase the power of internal combustion engines, using superchargers which make it possible to introduce compressed charge air into the combustion space of the internal combustion engine. After the compression of the charge air, this is cooled via a charge-air cooler and subsequently delivered to the combustion space. The routing of the charge air between the individual assemblies takes place via charge-air hoses which have to withstand high and pulsating pressure loads and also dynamic stresses as a result of the tie-up of the charge-air hoses to the vibrating assemblies as well as high temperatures. Furthermore, high oil resistance, good adhesion of individual plies of the charge air hoses and a long service life are required. Depending on the installation conditions and the ratings, different designs of the charge-air hoses, using various types of rubber, are adopted. Thus, for example, charge-air hoses with a fluoroelastomer inner layer, with a peroxidically cross linked silicone elastomer layer constructed on it, with a reinforcing ply having strengtheners and with a silicone elastomer outer layer are employed, the fluoroelastomer inner layer serving as a barrier layer with a low permeation rate and with high heat resistance, and based on peroxidically cross-linked fluororubber, with the result that good tie-up or adhesion to the overlying silicone elastomer intermediate layer and consequently high durability can be ensured. What is described, furthermore, is the use of knits made from textile yarns, such as, for example, from meta- or para-aramids, or other yarns which have sufficiently high strength and temperature resistance, for the reinforcing ply composed of strengtheners. The publication proposes to use, for a charge-air hose, a fluoroelastomer inner layer which is cross-linked both bisphenolically and peroxidically, whereby an improved bond between the fluoroelastomer inner layer and the silicone elastomer intermediate layer can be achieved. The fluoroelastomers are cross-linked fluororubbers (FKM), and fluororubbers can be obtained by the copolymerization or terpolymerization of the following monomers: vinylidene fluoride (VF2), hexafluoropropylene (HFP), tetrafluoroethylene (TFE), 1-hydropentafluoropropylene (HFPE), perfluoro(methylvinylether) (FMVE). In addition, monomers with reactive groups can be incorporated into the polymer chain in order to facilitate cross-linking. All organic peroxides known to a person skilled in the art of fluororubber cross-linking, for example 2,5-dimethyl, 2,5-di-(tert-butylperoxy)hexane or dicumyl peroxide, which are usually employed with suitable coactivators, for example triallylisocyanurate, should be used as peroxidic cross-linking chemicals. All systems known for the cross-linking of fluororubbers, for example with bisphenol A or AF, may likewise be used as bisphenolic cross-linking systems, the systems usually being composed of the cross-linking agent (bisphenol), of an accelerator (for example, phosphonium salt) and of a base (for example, a combination of calcium hydroxide and magnesium oxide). Fluororubbers are also obtainable in which the bisphenolic cross-linking system is cointegrated into the rubber. The publication proposes, furthermore, to use as the elastomer outer layer a peroxidically cross-linked silicone elastomer outer layer which, during vulcanization, makes it possible to have an optimal bond with the silicone elastomer intermediate layer which partially penetrates through the reinforcing ply. It is also proposed to use in the charge-air hose a winding process for forming the reinforcing ply. A tie-up of the charge-air hoses to the assigned assemblies of the motor vehicle is to take place by means of what are known as Henn couplings.

DE 10 2004 051 073 A1 builds on the assumption that, for charge-air hoses subjected to high dynamic load, manufacture must take place from yarns with endless filaments, whereas only hoses not loaded dynamically are reinforced with strengtheners in the form of fabric ribbons made from short fiber stable yarns with a filament length of 10 to 60 mm, which will not be suitable for the dynamically highly loaded charge-air hoses which may possess complicated geometry, since sufficient strength will not be generated thereby. The publication proposes to form the textile strengtheners with a meta-aramid yarn or twist of the "stretch broken" type composed of filaments with a length of 200 to 1400 mm, the fineness of the yarns or twists being 1000 to 10 000 dtex, preferably 3000 to 8000 dtex. Yarns or twines of the "stretch broken" type are yarns or twines which are spun from a large number of individual filaments and are then fixed and subsequently drawn apart. The filaments consequently tear in an undefined way and project partially out of the yarn or twine. Meta-aramid yarns of the "stretch broken" type possess high strength and temperature resistance and also a modulus of elasticity which is lower in the stretch range by up to approximately 8%, at a temperature of 200° C., than in the case of meta-aramid yarns composed of endless filaments. In the working range of elastomeric products, the modulus of elasticity of embedded elastomer and that of embedded yarn are approximately equal. Thus, there is a reduction in the cutting of the strengthener into the elastomer during use, which ultimately should lead to an increase in the service life of the products. It is mentioned that at least one reinforcing ply present between elastomer plies and composed of the textile strengtheners in the form of "stretch broken" yarns may be present in a charge-air hose. The reinforcing ply may be in the form of a knit. The elastomer plies of the charge-air hose may be based on hydrated nitrile rubber, silicone rubber, fluororubber or acrylate fluororubber. In addition to the knit ply and the embedded elastomer plies, the charge-air hose can also have further plies and layers, such as, for example, further inner and outer layers or plies composed of different polymeric materials. The charge-air hose is produced by means of conventional processes, for example by the strengthener ply being applied by means of suitable processes to an extruded rubber mix inner layer and subsequently the rubber mix outer layer being applied thereto at the extrusion process. The hose is then vulcanized by means of conventional processes.

DE 34 45 282 A1 relates to a rectilinear line pipe for underground placement by means of concrete forms, and for one embodiment two non-coaxial pipes oriented parallel to one another are foamed around in the line pipe and are protected externally by an outer pipe. Both the inner pipes and the outer pipe are produced from plastic with reinforcement composed of fiber knit. Production is carried out by applying individual plies to an inliner which is provided as a semifinished product and which constitutes a core pipe. The line pipe serves for heat-insulated transport of gaseous and liquid media, during which leak tightness is of primary importance in addition to heat insulation, but there is no thermal or dynamic stress upon the line pipe.

GB 1,146,872 also relates to a hose, to be precise a straight hose for hydraulic applications with essentially static pressures up to 17.5 bar. Manufacture is by extrusion on a mandrel. The hose possesses an inside diameter of 6.3 mm, while the outside diameter amounts to 14.7 mm. What is used as a reinforcing ply is a braiding composed of monofilaments sheathed individually with a thermoplastic material, rubber or PVC by extrusion and composed of nylon, rayon, polyethylene terephthalate or polypropylene, the braiding produced then being glued together by "baking" the sheathing.

U.S. Pat. No. 6,807,988 also relates to a non-generic straight hose for the conveyance of fluids under pressure, which is manufactured on a core pipe and is reinforced thermoplastically. The hose is used for mobile and industrial hydraulic applications with pressures up to 82.7 MPa. The core pipe may be of multilayer form with an inner layer or lining having high chemical resistance to prevent swelling, crazing, stress cracking and corrosion, and with resistance to attacks by weakly acidic or alkaline solutions, phosphate ester solutions and alcohols and also organic solvents, hydrocarbons or inorganic solvents. Two to eight or more reinforcing layers are arranged over the core pipe in the pipe walls and may in each case be braided, knitted or packaged in the conventional way. Exemplary embodiments with spiral helical windings having oppositely oriented spiral turns are illustrated. The yarn is wound helically under tension in one direction, that is to say either round to the left or round to the right, while the next immediately following layer is wound in the opposite direction. A variation in the twist of the winding is also proposed, whereby a fatigue strength under bending and a pressure resistance of the hose and also the costs are to be optimized. To reduce the axial stretch for high-pressure applications, the angle of the spiral winding must be optimized in an angular range of 40° to 65° with an optimum at 54.7°, with the result that a "neutral pitch angle" is to be formed. The individual turns lie directly one on the other. An adhesion promoter is employed between individual layers.

United States patent application publication 2006/0223399 A1 discloses a hose which is manufactured on a mandrel and which is obviously intended for hydraulic applications. A single fiber is either braided or spiral wound here onto an extruded non-vulcanized pipe in order to form a fiber reinforced ply. After an intermediate layer has been applied to this reinforcing ply, a further fiber is wound spirally and is pressed into the circumferential surface of the intermediate layer.

U.S. Pat. No. 5,077,018 discloses a hose in which a fiber provided with a dip coating is employed. The hose is manufactured on a mandrel which stipulates a rectilinear longitudinal axis and a constant cross section of the final product. An exemplary embodiment with two reinforcing plies composed of braided fibers is illustrated.

SUMMARY OF THE INVENTION

It is an object of the invention to provide a method for making a charge-air hose which is improved particularly with regard to the following: dynamic motional and compressive loads; thermal load; shape and dimensional stability during operation; pressure resistance; functionally reliable tie up to adjacent assemblies; and/or, sound insulation.

The invention relates to a method for making a special hose, to be precise a charge-air hose for motor vehicles, which has to satisfy special requirements with respect to manufacture and to the stresses taking effect during operation, so that it is not comparable to a hydraulic hose, line pipe and the like.

In the method according to the invention, first, a continuous inliner is produced in an extrusion process, its cylindrical inner face being shaped pneumatically in a dome-free manner, being brought to a diameter D (indication refers to diameter upon cooling to room temperature) and/or being held at this. Thus, according to the invention, there is no application of the inliner (and the follow-up plies) on a mandrel, thus making it unnecessary to have complicated manufacturing sequences with the intermittent demand for a dome and with separation of hose and dome and, in some instances, allowing continuous manufacture in the first place. On the other hand, the invention advantageously allows for the fact that the shaping and supporting action of a mandrel can be used in the process according to the invention for generating the individual plies or layers of the charge-air hose.

A person skilled in the art, contrary to the present invention, has hitherto favored applying textile reinforcing plies and yarns under high prestress to an inner elastomer ply for charge-air hoses. The reason for this is that the reinforcing ply or the yarn should be "embedded" into the elastomer ply, this being assisted by the high prestress. Furthermore, the prestress can lead to desired stiffening of the charge-air hose. Finally, applying the reinforcing ply under prestress can avoid the situation where some yarn subregions lie loosely in the charge-air hose, for example between individual knots, whereas other yarn subregions are already tensioned or are tensioned earlier under dynamic stress. The result of this, on the one hand, is that the yarn arranged in the charge-air hose comes into full effect only when sufficient deformation of the charge-air hose occurs during operation in such a way that all the yarn subregions are tensioned. On the other hand, when charge-air hoses undergo stress, with sometimes non-tensioned yarn regions and sometimes tensioned yarn regions, an uneven rigidity behavior and therefore stretch behavior occurs in the hose material, which leads to increased stresses upon the hose material, particularly as a result of shear stresses which arise.

In spite of these known advantages, in applying textile reinforcing plies under high prestress onto an elastomer ply supported on a mandrel as an abutment for the prestress, the invention allows for mandrel-free continuous manufacture with pneumatic support so that manufacture can be simplified. The method of the invention eliminates the disadvantages of mandrel-free manufacture, which are presumed by a person skilled in the art, by means of measures which are yet to be explained in more detail below. The phrase "shaped pneumatically in a mandrel-free manner", brought to a diameter and/or held at this is also understood to mean pneumatic maintaining and/or support of a cylindrical inner face of the inliner after previous shaping by other measures, for example in the exit region of the extruder.

According to the invention, therefore, an inliner also does not have to be provided in the form of a semifinished product or prefabricated core pipe for the production process and integrated into the method sequence. In addition to the obvious simplification of the method by the manufacture of the inliner in a continuous extrusion process, the invention, under certain circumstances, also enables the production possibilities and the choice of material for the inliner to be broadened.

In the method according to the invention, a continuous charge-air hose section is formed, in which an elastomeric inner ply, a first knit ply, an elastomeric intermediate ply, a second knit ply and an elastomeric outer ply are applied to the inliner successively, coaxially and continuously. It will be appreciated that, in the addition to the layers mentioned, any other further layers or plies may be integrated into the charge-air hose section or may be tied up to this, without this necessarily being the case.

Furthermore, according to the invention, not only a reinforcing ply in the form of a winding or braiding is used. Instead, according to the invention, a knit is used. This embodiment is based on the recognition that the use of a spiral winding, which does not cause bonding between adjacent flights of the winding, or of a braiding makes it possible to only a limited extent to have variations in diameter during operation or during the production process. The reason for this is that, for a braiding or straightforward spiral winding, a change in diameter would necessitate an elongation of the yarn. The stitch-forming thread subregions of the knit used according to the invention constitute here a kind of "excess material" which can also allow variations in diameter amounting to diameter jumps, so that, in a vulcanizing station, even complex three-dimensional charge-air hose structures can be formed and/or expansions in diameter can take place.

According to the invention, however, not only is a single knit ply used, but a first knit ply and a second knit ply are present in the charge-air hose. Tests by the applicant have shown that distribution of the same yarn quantity to two knit plies leads to markedly higher running times in a service life test than the distribution of the same yarn quantity to only one knit ply. Correspondingly, when the two knit plies are used and when there are the same service life requirements, there can be a markedly reduced amount of yarn used, as compared with the use of only one knit ply, thus ultimately leading to a cost saving. Also, under certain circumstances, by two knit plies being used, the mass or wall thickness of the charge-air hose can be reduced, although this does not necessarily have to be so.

A further advantage of using two knit plies instead of one knit ply with a thicker yarn is that thicker loop knots are also formed in the thicker yarn which would have to be used for a single-ply knit. However, the knots in the charge-air hose constitute inhomogeneities which, as a result of their intrinsic movement, may destroy the surrounding material from inside under dynamic stress and under alternating compressive and tensile load. The use of two knit plies makes it possible to employ a yarn with reduced yarn thickness, thus leading to smaller loop knots, with the result that the abovementioned undesirable effects of material destruction are at least diminished. Tests by the applicant have shown that the reduction in yarn thickness, as explained, may lead to a lengthening of the service life by up to a factor of 2.

A further advantage of the embodiment according to the invention is that the increase in the number of plies results in crack propagation in the charge-air hose in the radial direction being retarded. Merely as an illustration, this can be explained by the example that, when a crack or cut is introduced into the outer ply, propagation is first retarded by the second knit ply and cannot continue to spread, so that the inner ply and the intermediate ply as elastomeric plies (and the two knit plies) can still ensure mechanical strength of the charge-air hose.

When the knits are produced in known knitting machines, the yarn is basically led spirally around the adjacent inner ply, the production of stitches, that is to say interlacing and knotting with adjacent turns, taking place, in contrast to the production of a simple winding, for example by means of what are known as latch needles. Without basic spiral orientation, the production of the knit plies cannot take place in the continuous process. The invention has recognized for the first time that the disadvantage of such a basic spiral orientation of the knit is that, under the stresses acting during operation upon the charge-air hoses, in particular the pressure pulsations and the vibrations of the adjacent assemblies, because of the spiral formation an anisotropic material behavior may occur, the result of which is that the shape of the curved charge-air hose varies according to the mechanical stress state, this being undesirable. On the contrary, the automobile manufacturer demands contour-stable hoses, since the existing installation conditions in the engine space are becoming increasingly more confined and the risk of critical contact of the charge-air hose with a moved, chafing and sometimes hot adjacent assembly has to be minimized.

According to the invention, the dimensional stability of the charge-air hose is increased in that the first knit ply and the second knit ply are manufactured with different orientations of the spiral lay. Put simply, for manufacturing the first and the second knit ply, identically operated conventional knitting machines are run through in different directions, although it is, of course, also possible that the knitting machines are designed or activated differently for manufacturing the different orientations, that is to say, for example, are run through in the same direction, but knit spirally with a different direction of rotation.

Furthermore, in the continuous production process according to the invention, the first knit ply and the second knit ply are produced from an endless yarn. This embodiment is based, in particular, on the recognition that the use of a "stretch broken" yarn according to DE 10 2004 051 073 A1 is not necessary.

If the continuous charge-air hose section is manufactured with the abovementioned plies, the individual charge-air hose blanks are cut to length. The charge-air hose blanks are then shaped on a mandrel, for example under the action of temperature, and in a vulcanizing station. The change to this shape may occur with curved longitudinal axis, corresponding to the shape desired in the engine space, and, if appropriate, the execution of variable cross sections may also take place here. What is critical in the process according to the invention, however, is that the mandrel, by means of which the charge-air hose blank is shaped, possesses at least one longitudinal portion, at which the diameter $D_2$ (the indication refers to the diameter at room temperature) is larger than the diameter $D_1$ (the indication likewise refers to the diameter at room temperature) of the inliner. Thus, according to the invention, the charge-air hose blank is expanded by shaping by means of the mandrel. This expansion process takes account of the fact, explained initially, that the charge-air hose section is manufactured in a mandrel-free manner and the knit plies are applied only with limited prestress to the inner plies not supported on the mandrel. The relatively loose knit is tensioned as a result of the expansion according to the invention, so that non-prestressed or insufficiently prestressed yarn subregions are eliminated as a result of expansion. The extent of prestress of the knit in the charge-air hose blank can be stipulated via the extent of expansion. In the embodiment according to the invention, the mandrel is at least 6% larger than the diameter $D_1$. For example, the mandrel may also be at least 8%, 10%, 12%, 15% or even at least 20% larger than the diameter $D_1$. Expansion preferably takes place to this minimum degree over the entire longitudinal extent of the charge-air hose. By means of expansion in the region of the mandrel, under certain circumstances, particularly in the case of simultaneous heating, the embedding of the knit plies into the adjacent elastomeric plies can also be improved.

It became clear that the charge-air hose produced by the method according to the invention can also act advantageously in terms of the acoustics of the entire turbocharger system in which the charge-air hose is used. The charge-air hose usually operates in direct proximity to the turbocharger which is highly noise-intensive during operation. In this case, the charge-air hose according to the prior art acts in a similar way to a resonant body, therefore it radiates an unpleasant whistling sound of the turbocharger into the surroundings and into the passenger space, which in most cases makes it unavoidable to use an additional silencer. The charge-air hose manufactured according to the invention with the two knit plies and with assigned elastomeric plies has proved to be advantageous in terms of the acoustics, since the multiplicity of different plies and the knit plies lead to increased damping, as a result of which, under certain circumstances, an additional silencer in the turbocharger system may even be dispensed with. It is possible that, because of the two knit plies, the exciting frequency from the turbocharger is split up, so that the undesired vibration energy of the turbocharger is apportioned to a multiplicity of frequencies, the sound level of which is then reduced.

A charge-air hose according to the invention has improved dynamic properties and improved possibilities for the absorption of the pulsating pressure load taking effect. With a suitable choice of the materials used, the charge-air hose according to the invention can be temperature resistant with regard to temperatures of up to 230° C. or above. The charge-air hose according to the invention may also be equipped with any desired contour profiles by appropriate shaping in the region of the mandrel in the region of a vulcanizing station. Furthermore, by expansion being varied over the longitudinal extent, a variation in rigidity behavior over the longitudinal axis can also be brought about, insofar as this is desirable. Moreover, under certain circumstances, the embodiment according to the invention also makes it possible to improve the tie-up of the charge-air hose to the adjacent structural elements or to the assigned couplings or connection pieces, since force can be introduced and transmitted via the different plies and the two knit plies.

The inliner is preferably designed in such a way that it provides an inner surface of the subsequent charge-air hose, the surface being insensitive to the media carried in the charge air hose, in particular also to diesel oil, lubricants or combustion residues of the internal combustion engine.

It is basically possible that the charge-air hose blanks are tied up or vulcanized to flanges, connection pieces or the like directly in the manufacturing process or the end regions of the charge-air hose blanks are already prepared by additional shaping in such a way that they can be connected to couplings, flanges or connection pieces. However, according to a further proposal of the invention, material-removing remachining takes place in the end regions of the charge-air hose blanks. By means of this material-removing remachining, the outside diameter of the end region of the fully vulcanized charge-air hose blank is changed to a desired coupling diameter. Furthermore, any possible nonroundness of the charge-air hose in the end region can be eliminated by means of remachining. According to the invention, in particular, a layer of the outer ply, the thickness of which is larger than 0.1 mm, for example larger than 0.2 mm, 0.4 mm, 0.8 mm or 1.2 mm, is eliminated by means of material-removing remachining.

While it is basically possible that a tie-up of adjacent plies takes place, using an adhesion promoter, in a further embodiment of the invention it is proposed, to simplify the process, that the tie-up of the inliner, of the elastomeric inner ply, of the first knit ply, of the elastomeric intermediate ply, of the second knit ply and/or of the elastomeric outer ply takes place without the use of an adhesion promoter.

While the material which may be used for the inliner is basically any material which can be exposed permanently to the media, such as, for example, combustion residues and oil, which act in the motor vehicle during operation, the use of an FPM material for the inliner has proved to be advantageous.

Basically any desired material, in particular elastomeric material, may also be used for the inner ply, the intermediate ply and the outer ply. In a preferred embodiment, however, the inner ply, intermediate ply and/or outer ply are extruded from a silicone material.

The possible significance of the thickness of the first and/or second knit ply has already been explained above. While it is basically possible to use filaments, filament bundles or yarns of any thickness and any construction for the first and/or the second knit ply, tests by the applicant have shown that it is especially advantageous if the first and/or the second knit ply possess/possesses a thickness in the range of 0.4 to 0.6 mm. It is likewise possible that two knit plies are used, in each case with 3000 to 6000 dtex, for example 5000 to 5500 dtex, so that, together, more than 10 000 dtex can be obtained for both knit plies.

Knit patterns which can be produced by means of conventional knitting machines may be used for the knit plies. In a preferred embodiment, however, the first and/or the second knit ply are/is a plain stitch knit or a lock stitch knit.

While any desired configurations of the diameter ratios and thicknesses of the individual plies are possible, it has proved especially advantageous in teams of the dynamic properties, acoustics, contour stability, mechanical strength and/or service life if the inliner possesses a wall thickness of 1.2 mm, the inner ply possesses a wall thickness of 1.1 mm, the intermediate ply possesses a wall thickness of 1.0 mm and the outer ply possesses a wall thickness of 1.5 mm. These are, however, also intended to embrace deviating wall thicknesses of the inliner, of the inner ply, of the intermediate ply and of the outer ply which deviate by at most 20% from the above-mentioned wall thicknesses.

A further embodiment of the invention is based on the applicant's recognition that the discharge behavior of extruders usually pulsates in terms of the delivery volumes or ejection rate. By contrast, knitting machines are usually operated at a constant speed. In order to make the adhesion of the individual plies to one another optimal, they have to be connected to one another in as stress-free a manner as possible. The invention has recognized in this case that the material behavior of the charge-air hose can be optimized and the inherent stresses reduced if, in an improved process according to the invention, adaptation of the ejection rate of at least one extruder to a working speed of at least one knitting machine is carried out via a synchronizer. In order to mention here only one example of an embodiment of a synchronizer of this type, a delivery rate of the extrudate or of the generated ply may take place via a sensor, and this delivery rate may be fed to a control which then carries out an adaptation of the working speed of the assigned knitting machine as a function of the delivery rate. While such control assumes pulsations of the delivery rate of the extruder and adapts the knitting machine correspondingly to these pulsations, it is also possible alternatively or additionally to control a delivery rate of the extruder in order at least to mitigate pulsations in the discharge behavior of the latter.

Adhesion between at least one knit ply and the ply, in particular outer ply, contiguous to this knit ply, can be increased if a rise in temperature of the contiguous ply or knit ply is carried out by an additional heating device before, during or after contact has been made between the contiguous ply and knit ply via a heating device.

In a further embodiment of the invention, the shaping of the charge-air hose blanks on a mandrel takes place at a temperature in a heating boiler of 185° C. (±20%) for 20 minutes (±20%) at or near the saturated steam pressure.

BRIEF DESCRIPTION OF THE DRAWINGS

The invention will now be described with reference to the drawings wherein:

FIGS. 1a to 1c show individual method steps of the invention;

DESCRIPTION OF THE PREFERRED EMBODIMENTS OF THE INVENTION

Figure 2:
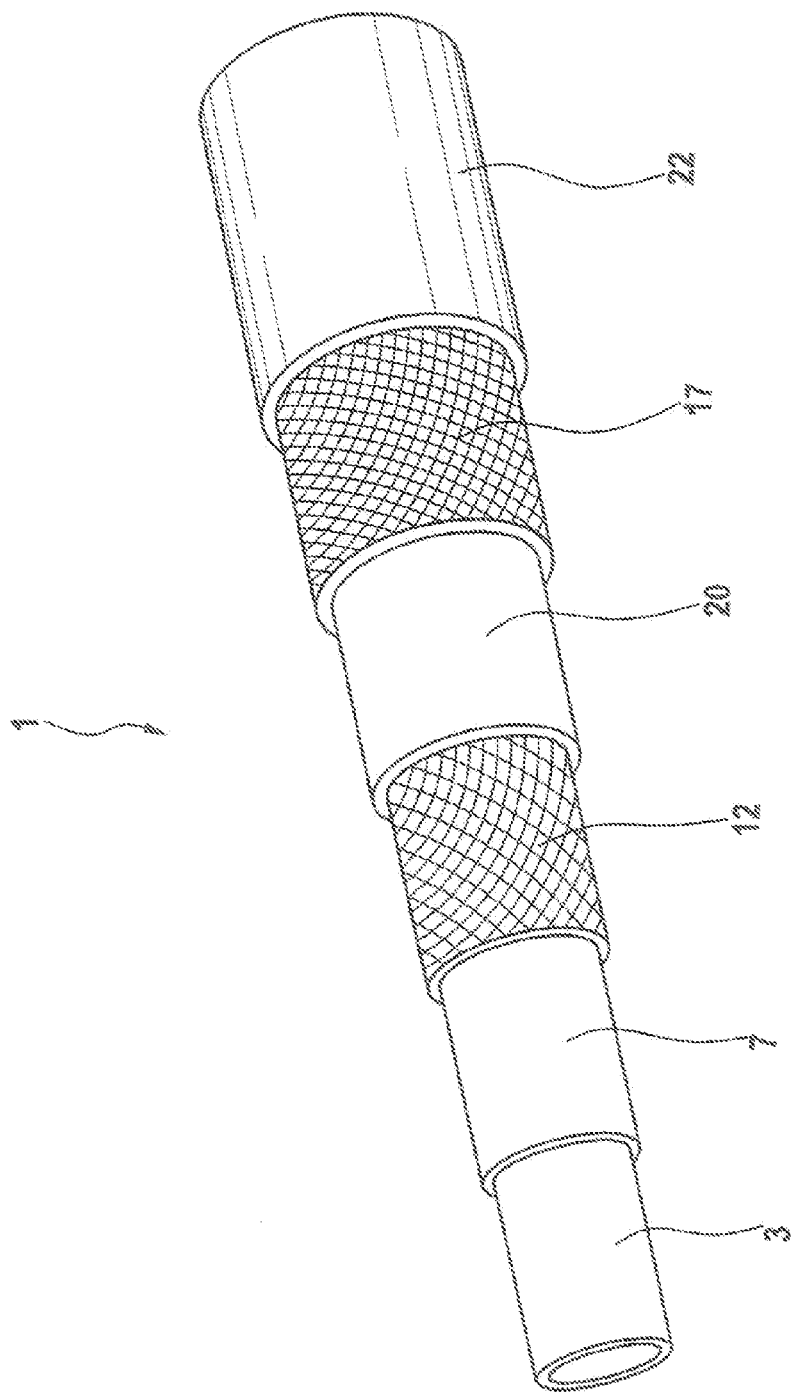
FIG. 2 shows a perspective view of a charge-air hose made with a method according to the invention with individual plies of the charge-air hose being successively exposed.

A method sequence for making a charge-air hose 1 is illustrated in FIG. 1a, FIG. 1b and FIG. 1c.

First, in an extruder 2, the inliner 3 having the pregiven outside diameter and inside diameter is extruded. A supporting-air airstream 4 is introduced into the hollow-cylindrical inner space via a pneumatic supporting head, which supports the sometimes warm and soft inliner against the externally acting air pressure and acting forces and weight forces and stabilizes the inner contour. The inliner 3 is measured on the exit side of the extruder by a measuring device 5, in particular a laser, for quality control purposes. The inliner is preferably produced from a fluoropolymer rubber or fluororubber (FPM). Subsequently, the inliner 3 may optionally be led through an adhesion promoter basin 6 in order to wet the surface area with the adhesion promoter. This is necessary particularly when an inner ply 7, which does not have the same cross-linking principle as the material of the inliner (in particular FPM), is to be applied subsequently to the inliner 3. While wetting with the adhesion promoter may take place by dipping in the adhesion promoter basin 6 illustrated, an adhesion promoter may alternatively also be applied by spraying. On the exit end of the adhesion promoter basin 6, the inliner 3 then wetted with the adhesion promoter can pass through a further measuring device 8. In the following extruder 9, the inner ply 7, which is an elastomeric ply, in particular a silicone ply, is applied to the surface area of the inliner 3, if appropriate with the adhesion promoter being interposed. On the exit side of the extruder 9, a further measuring device 10 is provided which detects the delivery rate of the inliner 3 with the inner ply 7 or the discharge rate of the extruder 9. Depending on the output signal from the measuring device 10, the rotational speed or delivery rate of the extruder 9 and/or the working speed of the following knitting machine 11 are/is influenced via a synchronizer, not illustrated. In the knitting machine 11, the first knit ply 12 is applied to the surface area of the inner ply 7 or is integrated thereinto.

The initial product of the knitting machine 11 is likewise detected (FIG. 1b) by a measuring device 13, for example, a light barrier. In the following heating device 14, heating, by means of which, in particular, the first knit ply 12 is heated to improve the tie-up or adhesion of the subsequently applied ply, here the intermediate ply 20, is carried out. Then, in a further extruder 15, the intermediate ply 20 is applied, which is preferably an elastomeric or silicone ply. Thereafter, in a second knitting machine 16, the second knit ply 17 is applied. Measurement of the initial product takes place via a further measuring device 18, in particular a light barrier (FIG. 1c).

As already explained above for the heating device 14, heating of the second knit ply 17, via which the tie-up of the following ply, here the outer ply 22, is improved, may be carried out by a heating device 19. In the following extruder 21, the outer ply 22 is then applied which is preferably also an elastomeric ply or silicone ply.

The continuous charge-air hose section 23 formed in this way is then delivered for the purpose of quality monitoring to a testing station 24 which may be, for example, an X-ray testing station. Subsequently, in a marking station 25, required markings, such as marking of the blank, article number, dates of manufacture, batch identification and the like, are introduced into the outer surface area of the outer ply 22. Optionally, the charge-air hose section 23 can then run through a powdering machine 26. On the exit side, the charge-air hose section 23 is delivered to a tower winding station 27, in the region of which the temperature of the charge-air hose section 23 is brought to a desired temperature, in particular is cooled. The charge-air hose section 23 is then cut in a cutting station 28 in to individual charge-air hose blanks 29 which are then delivered to respective mandrels (30a, 30b), in particular a heating mandrel, on which the charge-air hose blanks 29 are then delivered to a vulcanizing station 31. The vulcanizing station 31 may be a heating boiler in which vulcanization takes place at approximately 185° C. for approximately 20 minutes at saturated steam pressure.

FIG. 2 shows the charge-air hose 1 with the plies which are tied or adhere to one another radially from the inside outward in the order mentioned and which are formed by the inliner 3, the inner ply 7, the first knit ply 12, the intermediate ply 20, the second knit ply 17 and the outer ply 22.

Figure 3:
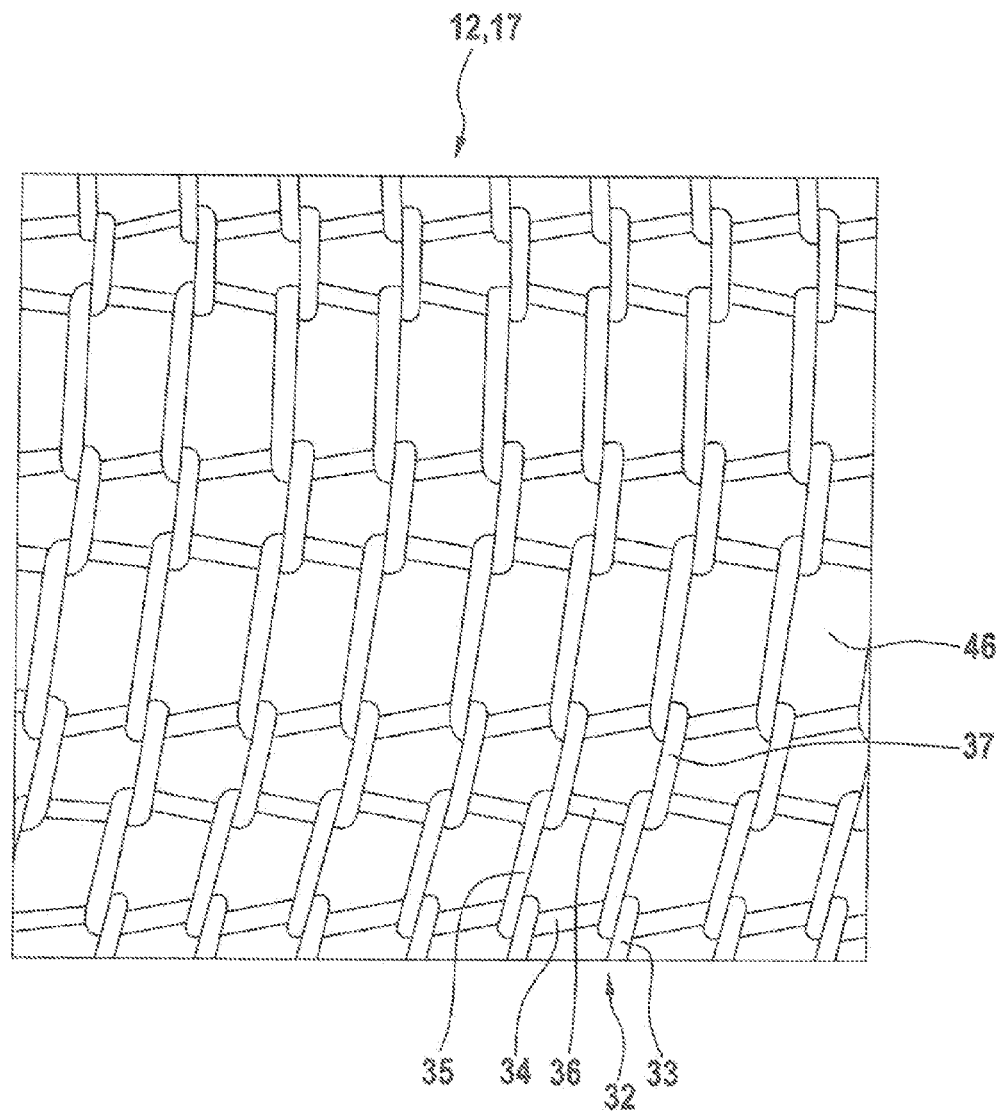
FIG. 3 shows a knit in "plain stitch" form.

FIG. 3 illustrates, enlarged, a knit ply 12 or 17 extending around the surface area of the inner ply 7 or intermediate ply 20, and being of the "plain stitch" fabric type. Here, in a turn 32, the thread is laid in each case in a meander-shaped manner, in each case with thread segments 33 to 37 oriented approximately perpendicularly to one another. Knots or loopings with the thread of the adjacent turn 32 are formed in the respective transition regions between adjacent thread segments. The thread segments 33 to 37 are continued in the circumferential direction, and they do not form a thread which is closed in a transverse plane, but instead are looped helically or spirally around the longitudinal axis, so as to give rise to individual turns 32 which are knitted together with the corresponding adjacent turns. According to the invention, the turns 32 for the first knit ply 12 and the second knit ply 17 are oriented in different directions, so that the turns of the first knit ply form a kind of right-hand turn and those of the second knit ply form a kind of left-hand turn (or vice visa).

Figure 4:
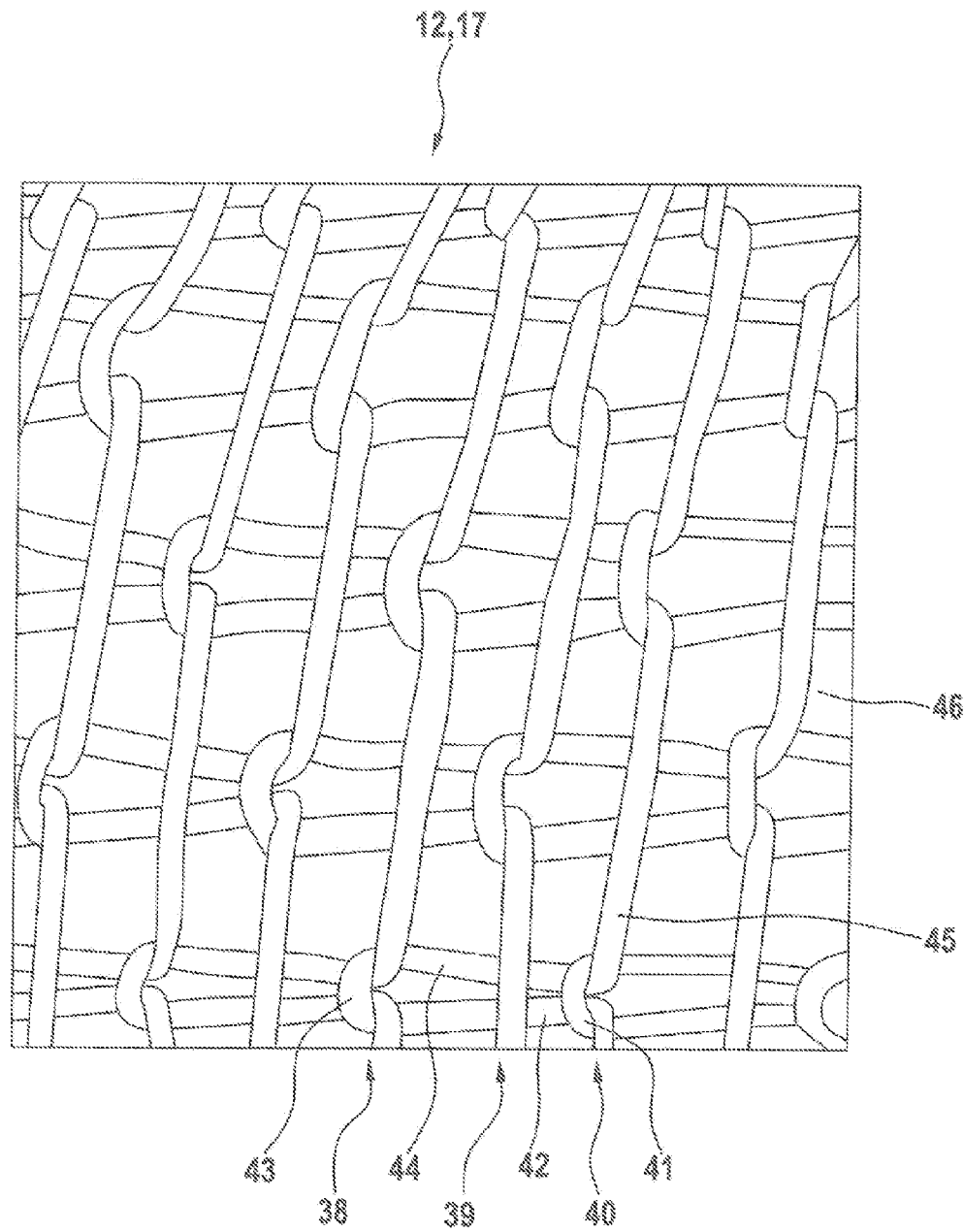
FIG. 4 shows a knit in "lock stitch" form.

FIG. 4 shows an illustration which corresponds essentially to FIG. 3, but for which the knit ply (12, 17) illustrated is formed as a "lock stitch". Here, turns (38, 39, 40) lying next to one another are provided, within which in each case likewise meander-shaped thread segments 41 to 45 are present. However, the knots of the turn 40 are not formed here with the adjacent turn 39. Instead, the thread segments (42, 44) extend past the adjacent turn 39 and interact in their end regions with the turn 38. For this embodiment of the knit plies (12, 17), too, the knit ply extends spirally or helically around the longitudinal axis. According to the invention, the two knit plies (12, 17) have different helical orientations oriented opposite to one another. Stitches 46 are formed between the individual thread segments for both types of knit according to FIGS. 3 and 4.

The inliner 3 preferably has a wall thickness of 1.2 mm and is produced from FPM. The inner ply 7 is preferably produced from silicone (VMQ) with a wall thickness of 1.1 mm. The first knit ply 12 possesses a wall thickness of approximately 0.5 mm which, however, can partly be reduced during the process from extrusion to vulcanization, with increasing embedding of the knit plying into the adjacent plies. The first knit ply 12 is covered by the intermediate ply 20 which is preferably a silicone ply (VMQ) with a wall thickness of 1.0 mm. The following second knit ply 17 with opposite orientation to the first knit ply 12 possesses a wall thickness of 0.5 mm which may likewise decrease on the way to vulcanization to 0. Finally, the outer ply 22 is preferably equipped with a wall thickness of 1.5 mm and produced with a silicone material (VMQ).

In a preferred embodiment, the inside diameter of the inliner 3 is up to 20% smaller than the outside diameter of the heating mandrel 30. The diameter values given and their changes preferably relate to the temperature when the charge-air hose blank 29 is applied to the mandrel 30 or the ratios at room temperature are given. For example, the charge-air hose blank 29 has an inside diameter of 47 mm and is drawn onto a mandrel 30 having an outside diameter of 59 mm. The expansion of the charge-air hose blank thereby brought about ensures the highest possible prestress in the knit, in order (a) to remove the structural induced stretch from the knit;
(b) to bring about uniform prestress over both knit plies;
(c) to ensure uniform stress distribution over both knit plies under compressive and tensile load; and,
(d) to ensure uniform force absorption over both knit plies.

Furthermore, expansion may serve for the firm incorporation of the knit plies (12, 17) into the adjacent plies.

While tests have shown that a charge-air hose blank 29 not expanded according to the invention may experience a change in circumference of more than 10% during operation of the internal combustion engine, the result of expansion according to the invention is that the change in circumference of the charge-air hose amounts to 5% or less. The corresponding reduced "breathing" of the charge-air hose 1 during operation leads to reduced stress upon the thread and reduced abrasion.

The yarn used for the knit plies (12, 17) is, in particular, p-aramid, m-aramid or POD, the last-mentioned material possibly resulting in price reductions for the knit plies (12, 17).

U.S. Pat. No. 6,807,988 proposes to use a thermal plastic instead of an elastomer for forming a ply. For plies of this type made from a thermal plastic, there is no chemical cross-linking of the individual plies, but instead liquefaction with a temperature rise. Plies of this type made from a thermal plastic are usually designed to be relatively hard in the conventional temperature ranges. Furthermore, a core pipe made from PA, which has no shaping capability, is used here. The problem for charge-air hoses 1 is the tie-up to flanges in which the hose cross sections or plies are pressed together radially, the result of which is that the inner ply 7, intermediate ply 20 and outer ply 22 are pressed against thickenings which are formed by the knots of the knit ply. As a consequence of the different strengths and stretchings or elongations of the elastomeric plies, on the one hand, and of the knit plies, on the other hand, damage, in particular cracks, may occur in the elastomeric plies and they may ultimately lead to mechanical failure and to leaks. According to the invention, the knit plies (12, 17) and the thicknesses of the yarns used can be reduced by using two knit plies instead of a single knit ply, with the result that the abovementioned effect is at least diminished.

It is possible that the use of two knit plies causes an overall wall thickness of the charge-air hose 1 which is larger than that of conventional hoses and also larger than the radial annular installation gap of standard flanges. In this case, cutting remachining of the surface area in the end regions of the charge-air hoses 1 may be carried out, with the result that these end regions can be brought to the required wall thickness by a reduction in the thickness of the outer ply 22.

Any desired identical or different yarns with identical or different diameters, such as are known per se from the prior art, may be employed for the first and the second knit ply. In a further embodiment of the invention, the yarn used for at least one knit ply is what is known as POD yarn. In this case, the yarn may be formed solely by polyoxadiazole (POD) and/or POD derivative and/or POD-copolymer or be composed of this. In another variant, a material combination is used which is composed of POD and/or a POD derivative and/or a POD copolymer and also of at least one further textile material or yarn which does not originate from the abovementioned POD group.

In a further variant, a yarn is used which is formed by POD and/or a POD and/or a POD derivative and/or a POD copolymer and also from at least one further material which does not originate from a textile group. As to details of the material POD, reference is made particularly to the publications U.S. Pat. No. 7,528,217 B2, which is incorporated herein by reference, RU 2 213 814 C2 and RU 2 213 815 C2 . The further textile material or textile yarn which should not originate from the POD group may be, for example, a synthetic or natural polymer, in particular polyamide, polyester, aramid (m-aramid or p-aramid), rayon, polyethylene terephthalate, polyvinyl alcohol, polyvinyl acetate, polyetheretherketone, polyethylene-2,6-naphthalate, polyphenylene, polyphenylene oxide, polyphenylene sulfide, polyphylene ether, combinations of the abovementioned materials also being possible. The proportion of the fraction of POD and/or the POD derivative and/or the POD copolymer within the textile hybrid system may be 50 to 90 percent by weight, in particular 55 to 80 percent by weight. The further material which does not originate from the textile group may be, for example, metal fibers, carbon fibers, glass fibers or basalt fibers, combinations of such fibers with one another or with other materials also being possible. It is possible that a yarn used for at least one knit is prepared so as to be adhesion-friendly, for example by means of a coating process with resorcinol formaldehyde latex (RFL). The yarn used may be a monofilament, a filament yarn, spun from a polymer, a cord thread, a torn thread, a staple fiber or the like, in which case the fineness (twist) may amount, in particular, to 1000 to 12 000 dtex. For the plies, known fluororubber components may be used, in particular EPM, EPDM, NBR, HNBR, FKM, CR, NR, SBR, IR, HR, BIIR, CUR, BR, CM, CSM, ECO, EVA, ACM, AEM, MQ, VMQ, PVMQ, FVMQ (cf. DE 10 2006 058 470 A1), MFQ, FFPM, FFKM, PU, in which case a thermoplastic vulcanizate containing a thermoplastic component, with partial cross-linking, may also be used.

As regards further details, in particular also the materials designated by the abovementioned abbreviations, reference is made to published German patent application DE 10 2010 017 679.6.

It is understood that the foregoing description is that of the preferred embodiments of the invention and that various changes and modifications may be made thereto without departing from the spirit and scope of the invention as defined in the appended claims.

List Of Reference Numerals

1 Charge-air hose
2 Extruder
3 Inliner
4 Supporting-air airstream
5 Measuring device
6 Adhesion promoter basin
7 Inner ply
8 Measuring device
9 Extruder
10 Measuring device
11 Knitting machine
12 First knit ply
13 Measuring device
14 Heating device
15 Extruder
16 Knitting machine
17 Second knit ply
18 Measuring device
19 Heating device
20 Intermediate ply
21 Extruder
22 Outer ply
23 Charge-air hose section
24 Testing station
25 Marking station
26 Powdering machine
27 Tower winding station
28 Cutting station
29 Charge-air hose blank
30 Mandrel
31 Vulcanizing station
32 Turn
33 Thread segment
34 Thread segment
35 Thread segment
36 Thread segment
37 Thread segment
38 Turn
39 Turn
40 Turn
41 Thread segment
42 Thread segment
43 Thread segment
44 Thread segment
45 Thread segment
46 Stitch

What is claimed is:

1. A charge-air hose comprising:
a continuous inliner produced in an extrusion process and having a cylindrical inner surface which has been shaped in a mandrel-free manner and was brought to and/or held at an inner diameter $D_1$;
an elastomeric inner ply applied to said inliner coaxially and continuously;
a first knit ply produced from an endless yarn and applied onto said elastomeric inner ply coaxially and continuously;
an elastomeric intermediate ply applied onto said first knit ply coaxially and continuously;
a second knit ply produced from an endless yarn and applied onto said elastomeric intermediate ply coaxially and continuously;
an elastomeric outer ply applied onto said second knit ply coaxially and continuously;
said first knit ply and said second knit ply having mutually different orientations;
said charge-air hose having a shape imparted thereto by a mandrel having a curved longitudinal axis and a diameter at least 6% greater than said inner diameter $D_1$;
said first knit ply and said second knit ply having subregions of non-prestressed yarn when said charge-air hose has said inner diameter $D_1$;
said subregions of non-prestressed yarn being eliminated when said shape is imparted to said charge-air hose; and
said first knit ply and said second knit ply having respective predetermined extents of prestress in a circumferential direction once said shape is imparted to said charge-air hose.

2. The charge-air hose of claim 1, wherein at least one of the first knit ply and the second knit ply is made of a POD yarn.

3. The charge-air hose of claim 1, wherein a tie-up of the inliner, the elastomeric inner ply, the first knit ply, the elastomeric intermediate ply, the second knit ply and/or the elastomeric outer ply is achieved without the use of a bonding agent.

4. The charge-air hose of claim 1, where the inliner is extruded from an FPM material.

5. The charge-air hose of claim 1, wherein at least one of the inner ply, the intermediate ply and the outer ply are extruded from an FPM material.

6. The charge-air hose of claim 1, wherein the endless yarn of at least one of the first knit ply and the second knit ply has a thickness lying in a range of 0.4 to 0.6 mm.

7. The charge-air hose of claim 1, wherein the endless yarn of each of the first and the second knit ply has 3000 to 6000 dtex per knit ply.

8. The charge-air hose of claim 1, wherein the endless yarn used for both the first knit ply and second knit ply in combination has greater than 10,000 dtex.

9. The charge-air hose of claim 1, wherein at least one of the first knit ply and second knit ply is/are formed as plain stitch.

10. The charge-air hose of claim 1, wherein at least one of the first knit ply and second knit ply is/are formed as lock stitch.

11. The charge-air hose of claim 1, wherein the inliner has a wall thickness of 1.2 mm, the inner ply has a wall thickness of 1.1 mm, the intermediate ply has a wall thickness of 1.0 and the outer ply has a wall thickness of 1.5 mm.

12. The charge-air hose of claim 1, wherein the wall thickness of the inliner, inner ply, intermediate ply and outer ply can deviate by a maximum of 20% from their respective wall thicknesses.

13. The charge-air hose of claim 1, wherein said continuous inliner has been produced by applying a synchronizer to adapt the ejection rate of at least one extruder to a working speed of at least one knitting machine.

14. The charge-air hose of claim 1, wherein said one knit ply is brought to an increased temperature during manufacture of said charge-air hose to increase a bond between at least one of said knit plies and the subsequently applied ply.

15. The charge-air hose of claim 14, wherein the subsequently applied ply is at least one of said elastomer inner ply and said elastomer outer ply.

16. The charge-air hose of claim 1, wherein the shaping of charge-air hose blanks of said charge-air hose takes place on a mandrel in a boiler at a temperature of 185° C. ±20% for 20 minutes ±20% at or near saturated steam pressure.

\* \* \* \* \*